United States Patent [19]

Takizawa et al.

[11] 4,309,728

[45] Jan. 5, 1982

[54] FRICTION FORCE DRIVE CAPSTAN TAPE RECORDER

[75] Inventors: Yoshiyuki Takizawa; Norihiko Itoh; Takashi Kashiwazaki; Tomomitsu Takano; Junji Kobayashi, all of Tokorozawa, Japan

[73] Assignee: Pioneer Electronic Corporation, Tokyo, Japan

[21] Appl. No.: 50,289

[22] Filed: Jun. 20, 1979

[30] Foreign Application Priority Data

Jun. 21, 1978 [JP] Japan .................. 53-84049[U]

[51] Int. Cl.³ .................. G11B 15/18; G11B 19/02
[52] U.S. Cl. .................. 360/71; 360/74.3; 360/96.3; 242/189
[58] Field of Search .......... 360/71, 69, 74.3, 96.3, 360/96.4; 242/189-190

[56] References Cited

U.S. PATENT DOCUMENTS

| 3,497,158 | 2/1970 | Calaway | 242/190 |
| 3,523,655 | 8/1970 | Bevis | 242/190 |
| 3,941,332 | 3/1976 | Matula | 242/189 |
| 4,104,685 | 8/1978 | Chang | 242/189 X |

FOREIGN PATENT DOCUMENTS

| 52-37019 | 3/1977 | Japan | 360/71 |
| 533978 | 11/1976 | U.S.S.R. | 360/71 |

OTHER PUBLICATIONS

IBM/TDB vol. 13, No. 1, Jun. 1970. "Tape Transport" by Fraim et al.

*Primary Examiner*—John H. Wolff
*Attorney, Agent, or Firm*—Sughrue, Mion, Zinn, Macpeak and Seas

[57] ABSTRACT

A friction force drive capstan tape recorder having movable arms to tension a tape between an idler and a drive capstan. The displacement of the arms is sensed to provide an input signal to a control circuit to vary the rotational torque of the take-up reel motor. This closed loop system allows constant tension to be maintained on the tape and the sensing of the end of the tape. Freely rotatable tape shifters are provided to minimize tension loss. The movable arms are outwardly displaceable to facilitate tape loading by means of a gear train coupled to the operating lever. At the same time the rollers are displaced to facilitate tape handling. A switch may be coupled to the operating lever to provide power to the system or cut it off.

18 Claims, 9 Drawing Figures

FRICTION FORCE DRIVE CAPSTAN TAPE RECORDER

BACKGROUND OF THE INVENTION

This invention relates to reel to reel tape recorder systems. More specifically this invention deals with improved tape tensioning as speed maintaining devices. Reel to reel recorders have been the subject of continued research into improving the mechanical-electrical interface to achieve greater reliability and improved performance.

One of the crucial aspects of performance is the requirement that the tape be driven past the heads at an extremely uniform speed and under the necessary tension to insure that the head-tape interface is maintained. Many such systems are known, a popular type using pinch rollers to achieve contact pressure with a drive capstan. Such systems, while generally effective, tend to stretch the tape and involve contact pressure on the magnetic sensitive surface. The use of pinch rollers therefore presents some undesirable problems. Accordingly, a second system, the frictional force drive capstan, has been the subject of study and potential commercial use.

A typical prior art device is shown in FIG. 1. As shown therein the principle of a frictional force drive capstan system tape recorder is such that, in order to stabilize and increase the frictional forces between a tape 3 and a capstan 1 and an idler 2, the winding angles of the tape 3 with respect to the capstan 1 and the idler 2 are increased by means of rollers 6' and 7' which are rotatably mounted on the ends of arms 4' and 5', respectively. In the frictional force drive capstan system tape recorder, unlike an ordinary tape recorder, no pinch roller is used to run the tape.

One of the problems of such systems is the setting of proper tension on the tape by settings of displacement of the arms 4' and 5' for different modes of operation. Additionally, during the course of a particular operation, the tape tension must be maintained constant, thereby imposing a real-time monitoring requirement.

Another requirement in reel to reel recorders is the necessity to sense an end of tape condition. In such recorders, the fast winding or play conditions should be terminated when this condition exist and well known techniques utilize a signal or metal strip placed on the tape at a predetermined end location. A sensor is employed to specifically monitor this condition and stop the drive motor action when sensed. While effective, these techniques require an additional detector for end of tape sensing.

In friction force systems, the loading of tape can be difficult if the force applying arms are positioned in a tension application position. However, if the arms are moved for tape loading, tension must be maintained for constant pressure maintenance during operation. Moreover, tape tension is a function of the operation performed. Accordingly, if the tension is to be maintained despite movement of the arms, such adjustment must be related to and carried out in association with a specific recorder function. This is done by varying take-up motor speed to maintain uniform tension.

Additionally in such systems, tape shifting devices are used to change the direction of the tape, particularly when it passes the heads. However, in some operations, such as fast winding, tension loss occurs resulting in the stretching of the tape, or making it difficult to accomplish uniform winding.

SUMMARY OF INVENTION

Accordingly, it is an object of this invention to provide for an improved reel-to-reel recorder offering improved tape speed control.

Another object of this invention is to provide an improved tape travel control device in a frictional force drive capstan system;

A further object of this invention is to provide a control circuit wherein the rotational speed of the take up reel is controlled by the pressure of the capstan biasing arms.

Yet another object of this invention is to provide for a control device wherein the end of tape condition and operating characteristics are functionally related to tape tension on the capstan biasing device.

Yet another object of this invention is to provide for an improved tape loading device in a frictional force drive capstan tape recorder.

Another object of this invention is to provide an electronic circuit for a drive device in a frictional force drive capstan tape recorder system.

Also, a further object of this invention is to provide for a tape shifting device that reduces frictional loss in a tape recorder system using frictional force drive techniques.

These and other objects of this invention are accomplished in an improved reel to reel frictional force capstan drive recorder. Rotating tape direction shifters eliminate tension losses and the movement of the tension arms is used to properly control tape tension as well as coordinate proper tape driving speed. Tape loading is facilitated by having the arms shift for placement of the tape. A drive device is employed to provide the proper tension to the tape corresponding to the function to be performed by the speed settings of the winding motors.

The invention will be described in greater detail with respect to the drawings and the description of the preferred embodiment that follows.

BRIEF DESCRIPTION OF THE DRAWINGS

FIG. 6 is a schematic side view of the essential elements of a recorder when the tape is loaded;

FIG. 7 is a schematic top view of the essential elements of the recorder shown in FIG. 6;

FIG. 8 is a block diagram showing a power switch operated by action of lever 35.

DETAILED DESCRIPTION OF THE PREFERRED EMBODIMENTS

Figure 2:
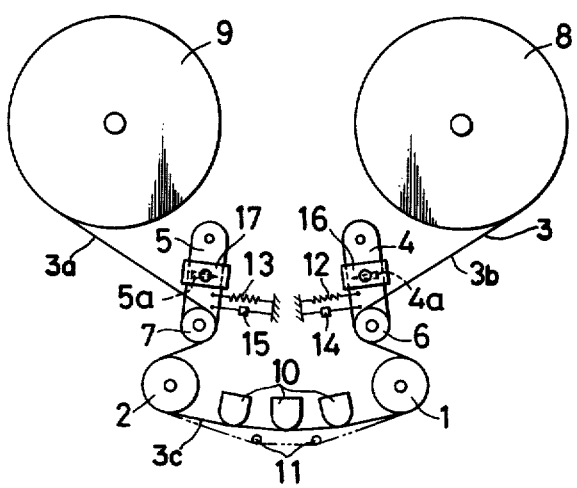
FIG. 2 is a schematic drawing showing the elements of a frictional force drive capstan system tape recorder according to this invention.

Referring to FIG. 2, a tape travel control device according to this invention in a frictional force drive capstan system tape recorder will be described. A tape 3 fed from a supply reel 9 is wound on a take-up reel 8 through a roller 7, an idler 2, a capstan 1 and a roller 6. The tape 3 is brought into contact with a head assembly 10 by shifters 11.

The rollers 6 and 7 are rotatably mounted on arms 4 and 5, respectively. The lower ends of the arms 4 and 5 are inwardly biased by springs 12 and 13, respectively, so that the tape 3 can be wound on the larger part of the peripheries of the idler 2 and the capstan 1. Dampers 14 and 15 are connected in parallel to the springs 12 and 13 to the arms 4 and 5, respectively.

The arms 4 and 5 have wedge-shaped slits 4a and 5a, respectively, which are tapered inwardly or in the biasing directions of the arms 4 and 5 by the springs 12 and 13. A first optical detector 16 comprising a light emitting element and light receiving element is disposed in such a manner that the light emitting element is on one side of the slit 4a of the arm 4 and the light receiving element is on the other side of the slit 4a thereof. Similarly, a second optical detector 17 comprising a light emitting element and a light receiving element is provided in such a manner that the former and latter elements are in front of and behind the slit 5a of the arm 5, respectively.

Figure 3:
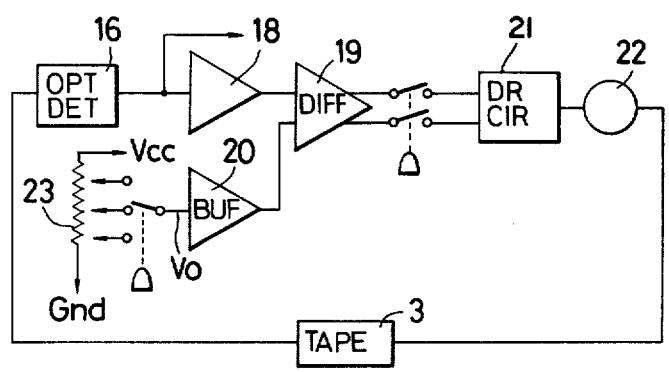
FIG. 3 is a block diagram of a control circuit to control the power of the take-up reel.

FIG. 3 is a block diagram of a control circuit in which the rotational power of the take-up reel 8 is controlled responsive to an output signal of the optical detector 16. The signal from the optical detector 16 is proportional to the rotational angle of the arm. The signal is applied through a compensation amplifier 18 including a phase leading circuit to one input of a differential amplifier 19 where the signal from the optical detector 16 is compared with a reference voltage Vo applied to the other input of the differential amplifier 19 through a buffer amplifier 20. The resultant comparison signal is delivered to a motor drive circuit 21, and thus the electric motor 22 of the take-up reel 9 is controlled. In accordance with the operation modes (record, playback, rewind and fastforward modes), the reference voltage applied to the buffer amplifier 20 is changed by switching a voltage divider 23. Although the control of the take-up reel 8 has been described, the control of the supply reel 9 is similarly achieved.

In the record or playback operation mode, the shifters 11 are moved so that the tape is brought into contact with the head assembly 10. If, in this case, the arm 5 has been displaced on a certain position, the moment exerted to the shaft of the arm 5 by the upstream and downstream parts of the tape 3 pulled by the roller is in balance with the moment exerted by the spring 13. The arm 4 is also maintained in a balanced condition similar to the arm 5. Accordingly, tension applied to the tape 3 in accordance with the arm displacements is determined by the springs 12 and 13 having predetermined spring constants.

In the fast-forward or rewind operation mode, since the tape 3 is positioned apart from the head assembly 10 by the shifters 11, the tension loss of the tape 3 between the capstan 1 and the idler 2 is changed.

As is apparent from the above description, if the reference voltage Vo is varied according to the operation modes, the rotational power corresponding to the tension loss can be applied to the take-up reel 8 and the supply reel 9. In addition, because of the circuit shown in FIG. 3, the tension of the tape can be servo-controlled and the frictional force of the tape 3 with respect to the capstan 1 can be controlled to be constant in a given operation mode.

As is clear from the above description, the proper tension can be applied to the tape by suitably setting elastic members such as springs adapted to exert the rotational moments to the arms. Since the tension is servo-controlled by the signals from the displacement detectors such as the optical detectors provided on the arms, the tape travel can be maintained in a constant condition.

Figure 4:
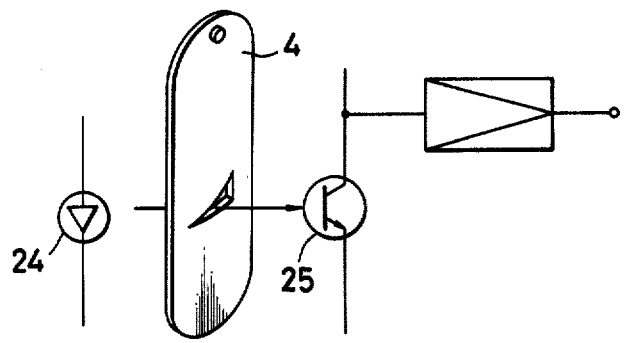
FIG. 4 is a schematic view showing the essential components of the optical light detector.

The signals from the optical detectors 16 and 17 can be utilized not only for the tension servo-control, but also for the detection of the tape end because, when the tape is wound up on either one of the reels, the arms 4 and 5 are greatly displaced due to the biasing forces of the springs 12 and 13. As shown in FIG. 4, the optical detector comprising the light emitting element 24 and the light receiving element 25 is fixedly disposed not to contact the arm 4. When the tape 3 is wound up around the take-up reel 8, the arm 4 pulled in the counterclockwise direction by the tape 3 is turned clockwise, or returned to the original position due to the bias action of the spring 12. As a result, the quantity of light passed through the slit 4a is increased.

Figure 5:
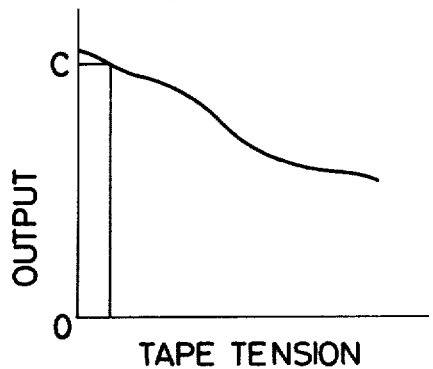
FIG. 5 is a graph showing the relationship between tension in the tape and the output of the light receiving element.

FIG. 5 is a graphical representation indicating the relationship between the tension of the tape 3 and the output of the light receiving element 25. As shown, the output is approximately inversely proportional to the tension of the tape. Accordingly, if a reference value of the output of the light receiving element 25 is set to be C so that it corresponds to zero tape tension, when the tape tension is great and the output of the light receiving element 25 is lower than C, the tape tension is controlled in accordance with the output thereof. When the tape is wound up on either one of the reels, with the result that the tension of the tape is decreased and the output is increased to be higher than C, then the output value indicates the fact that the tape tension is zero, i.e., the fact that the tape has been wound up on either one of the reels is confirmed.

Therefore, a significant effect can be obtained by the abovedescribed method. Specifically, the output of the light receiving element 25 is applied to a tape tension servo control system and to a tape travel stop mechanism provided with a comparator. The comparator implements the comparison between the reference value and the instantaneous value in the output of the light receiving element 25, and the output of the comparator is utilized to stop the tape travel.

As described above, the tape travel control device is utilized for detecting the end of the tape. Accordingly, it is unnecessary to additionally provide a special detector to detect the end of the tape. The result is that the number of components and the number of manufacturing steps are reduced and the system reliability is remarkably improved.

Figure 1:
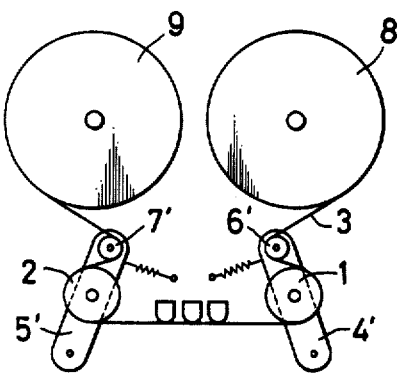
FIG. 1 is a schematic drawing showing the elements of a prior art frictional force drive capstan system tape recorder.

A tape direction shifter device in the friction force capstan system will now be described with reference to FIGS. 1 and 2 in comparison with a prior art tape shifter device shown in FIG. 1.

When the recorded information is reproduced or new information is recorded on the tape 3, the same degree of tension Ts should be applied to the tape 3 at the input side 3a and the outgoing side 3b of the capstan 1. In the prior art tape direction shifter device as shown in FIG. 1, however, when the tape 3 is rewound, it is pulled by tape shifters 11. Assuming that the tension loss caused by the tape shifters 11 is Te, a tape tension of Ts+Te is required for applying to the part 3c of the tape 3. The tension Ts+Te exerted has a bad influence on the tape 3 in the prior art device.

As shown in FIG. 2, tape direction shifters 11 according to the present invention are designed in such a way that they do not have large resistance to the tape 3 but they are made to be freely rotatable when the tape 3 is wound thereover while pulling the tape 3 apart from the head assembly 10.

Accordingly, it is possible to reduce the tension loss Te of the tape shifters 11 to approximately zero. As a result, only the tension Ts for frictionally contacting the tape 3 to the capstan 1 is required in the part 3c of the tape 3. That is, the tension loss caused by the tape direction shifters can be greatly reduced, so that the tape travel can be smoothly implemented without exerting a bad influence on the tape, especially when the tape is wound fast.

A tape loading device in a frictional force drive capstan system tape recorder will be described with reference to FIGS. 6 through 8.

Figure 6:
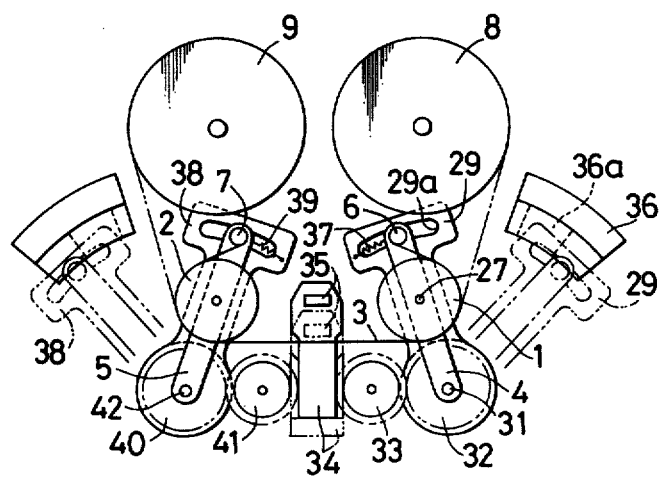
FIGS. 6–8 are schematic views of a tape loading device in a frictional force drive capstan system, specifically.

In FIG. 6, reference numerals 8 and 9 designate the take-up reel and a supply reel, respectively. The tape 3 fed from the supply reel 9 is advanced through the roller 7, the idler 2, the capstan 1 and the roller 6 to the take-up reel 8, and it is wound on the take-up reel 8. The idler 2 is rotatably supported on the upper surface of a chassis 26. The capstan 1 is fixedly mounted on a drive shaft 27 extending through a hole in the upper surface of the chassis 26.

Figure 7:
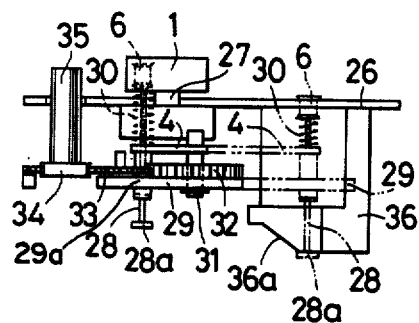

As shown in FIG. 7, the roller 6 is rotatably mounted on the top of a shaft 28. The shaft 28 extends through an arm 4 and a guide hole 29a of a guide arm 29. The roller 6 has a slide part 28a at the lower end thereof which is in contact with the cam surface 36a of a cam 36. A spring 30 is placed over the shaft 28 between the roller 6 and the arm 4, to energize the roller upwardly. The other end portions of the arm 4 and the guide arm 29 are rotatably mounted on a shaft 31 extending from the lower surface of the chassis 26. A gear 32 is placed over the shaft 31 and is integral with the guide arm 29. The gear 32 engages another gear 33 which is engaged with a loading gear 34. The loading gear 34 is connected to an operating lever 35. A spring 37 is provided to pull the shaft 28 inwardly along the guide hole 29a of the guide arm 29 at all times. The spring 37 is disposed between the guide arm 29 and the shaft 28.

A mechanism associated with the roller 6 on the capstan 1 side has been described. The mechanism for the roller 7 on the idler 2 side is symmetrical with the roller 6 mechanism and similar thereto. That is, the arm 5, the guide arm 38, and the spring 39 correspond to the arm 4, the guide arm 29, and the spring 37, respectively. Furthermore, the gear 40, the gear 41 and the shaft 42 correspond to the gear 32, the gear 33 and the shaft 31, respectively. Components not shown on the roller (6) side also correspond to components not shown on the roller (7) side.

FIG. 6 shows the running condition of the tape 3 loaded. When, under this condition, the lever 35 is depressed downwardly, then the loading gear 34 transmits the rotational power through the gear 33 and the gear 41 to the gear 32 and the gear 40, respectively. As a result, the guide arms 29 and 38 are turned outwardly to positions indicated by the phantom lines. Simultaneously, the shaft 28 is turned and therefore the slide part of the shaft 28 is brought into contact with the cam surfaces 36a of the cam. As a result, the shaft 28 is moved downwardly to pull the roller 6 toward the chassis 26. Thus, the roller 6 is sunk in the chassis 26. Simultaneously, the other roller 7 is also sunk in the chassis in the same manner.

In this condition, the tape 3 can be readily taken out. The tape 3 can be loaded as follows: Under the condition where the lever 35 is depressed down, the tape 3 is laid as indicated by the phantom line in FIG. 6. Then, the lever 35 is pulled upwardly. As a result, the rollers 6 and 7 are moved upwardly, and abut against the tape 3 to set the latter 3 as indicated by the solid line in FIG. 6. Thus, the tape 3 can be readily loaded.

While the loading gear 34 is maintained elevated by pulling the lever 35 upwardly, the tape 3 is laid over the capstan 1 and the idler 2. Therefore, a satisfactory effect can be obtained if the power switch is provided in association with the lever 35 or the loading gear 34 in such a manner that it is turned on when the lever 35 is pushed down and it is turned off when the lever 35 is pulled up.

Figure 8:
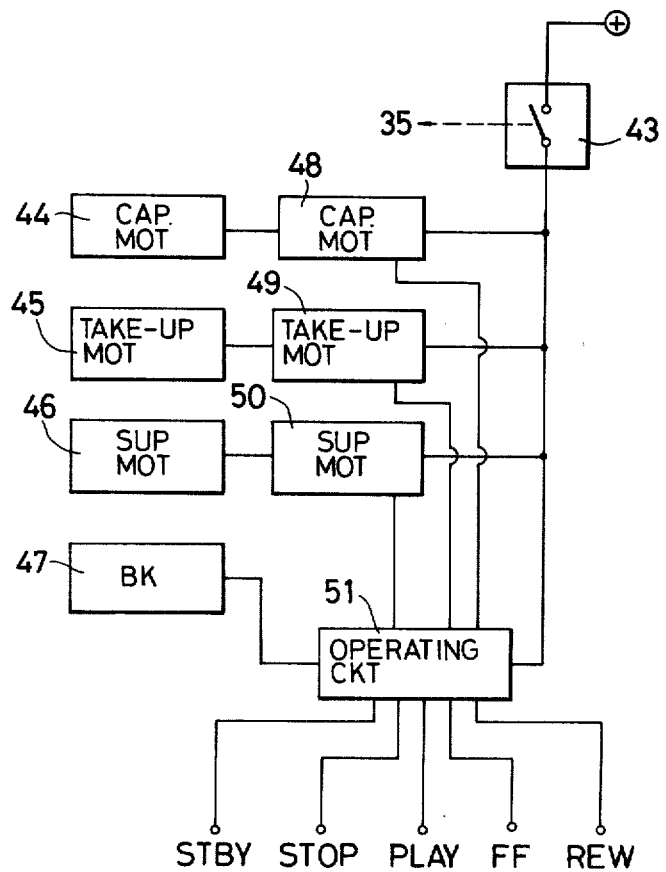

More specifically, FIG. 8 shows such a circuit designed such that the power switch 43 is operated in association with the lever 35 to energize the entire circuit. The circuit shown in FIG. 8 comprises: a capstan motor 44; a take-up reel motor 45; a supply reel motor 46; a reel brake 47; a capstan motor drive circuit 48; a takeup reel motor drive circuit 49; a supply reel motor drive circuit 50; and an operating circuit 51. A standby signal, a stop signal, a play signal, a fast-forward signal, and a rewind signal are selectively applied to the operating circuit 51 according to the operation modes and associated keys. As shown, closing the switch 35 completes the power circuit to allow operation of the system.

Figure 9:
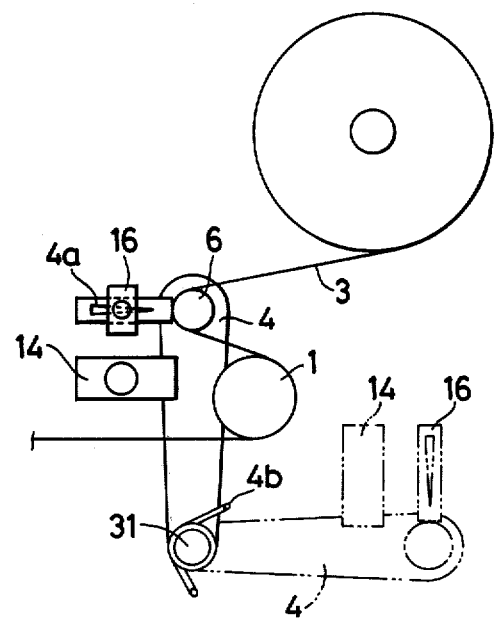
FIG. 9 is a schematic drawing showing an arm of the tape loading device shown in FIG. 6 and its associated elements.

Although omitted in FIG. 6 to avoid complexity, the optical detector and the damper 14 are attached to the arm 4 as shown in FIG. 9. The optical detector comprises a light emitting element and light receiving element disposed in such a manner that the light emitting element is on one side of the wedge-shaped slit 4a and the light receiving element is on the other side thereof as shown in FIG. 4. The damper 14 may be positioned between an N-pole magnet and an S-pole magnet, so that it receives a magnetic braking force in accordance with an eddy current produced by the movement of the arm 4. When the tape recorder is actuated, the optical detector 16 operates to detect the displacement of the arm 4 and the detected signal is delivered to the reel drive motor to implement servo-controlling of the tape tension. When the tape is loaded, the arm 4 is moved to the position indicated by the phantom lines in FIG. 9. In this case, only the wedge-shaped slit 4a and the damper 14 are moved together with the arm 4 to reduce the moment of inertia of the arm 4. A torsion spring 4b is attached to the shaft 31 of the arm 4 to return the arm 4 to the original position. Although not shown in the drawing, a magnet or other returning device may be employed instead of the torsion spring.

It is apparent that modifications of this invention can be accomplished without departing from the essential scope of this invention.

We claim:

1. In a reel to reel friction force drive capstan tape recorder wherein a tape is fed from a supply reel to a take-up reel, a motor for driving said take-up reel, said tape being wound between an idler, a drive capstan and rollers mounted on movable arms, means for biasing said arms to vary the winding angles of said tape relative to said capstan and said idler, the improvement comprising, means for sensing the position of at least one of said arms, control means responsive to said sensing means for controlling the rotational power of said take-up and supply reels, said recorder having a plurality of operational modes, and said control means including means for determining the rotational power to be imparted to said reels in accordance with the operational mode of said recorder.

2. The recorder of claim 1, wherein a roller is mounted on each arm, said biasing means comprising spring means for biasing said arms toward one other, and damper means arranged in parallel with said spring means.

3. The recorder of claim 1, wherein said sensing means comprises a light transmitting element positioned on one side of said arm, a slit in said arm for the passage of light and a light receiving element positioned on the opposite side of said arm.

4. The recorder of claims 1 or 3, wherein said control means comprises a compensation amplifier receiving the output of said sensing means, said output being a function of the rotational angle of said arm, comparator means for comparing the output of said amplifier with a reference signal, and drive circuit means for controlling the speed of an electric motor.

5. The recorder of claim 4 further comprising voltage divider means for determining said reference signal in accordance with the operational modes of said recorder, and a buffer amplifier for supplying said reference signal to said comparator means.

6. The recorder of claim 4 wherein said comparator means is employed to sense the end of said tape.

7. The recorder of claims 1 or 2 wherein said sensing means comprises a light transmitting element positioned on one side of each arm, each arm having a slit for the transmission of light, and a light receiving element positioned on the opposite side of each arm to receive light passing through said slits.

8. The recorder of claim 1 further comprising freely rotatable tape shifter means positioned between said idler and said capstan.

9. The recorder of claim 8 wherein said tape recorder further comprises a tape head, and said tape shifter means comprises first and second freely rotatable posts positioned on adjacent sides of said tape head.

10. The recorder of claim 1 further comprising gear means for outwardly displacing said arms, and means for displacing said rollers relative to said arms.

11. The recorder of claim 10 further comprising an operating lever, and wherein said means displacing said arms comprises a gear train responsive to the movement of said operating lever, to rotate said arms.

12. The recorder of claim 11 wherein said gear train comprises a loading gear coupled to said operating lever, an intermediate gear engaging said loading gear and, a gear mounted on said arm being in contact with said intermediate gear, said arm mounted for rotation about a shaft, and said gear being mounted on said arm concentric with said shaft.

13. The recorder of claims 10 or 11 wherein said rollers are mounted on a shaft positioned on said arm, a sliding part disposed on said shaft, a cam section fixed to said recorder and positioned to engage said sliding part, wherein movement of said gear means shifts the position of said sliding part into engagement with said cam section to displace said shafts and said roller relative to said arm.

14. In a reel to reel tape recorder wherein a tape is fed from a supply reel to a take-up reel, said tape being wound between an idler, a drive capstan and rollers mounted on movable arms, the improvement comprising, means for rotating said arms and means for moving said rollers in a vertical direction along axes of rotation thereof, the movement of said rollers being perpendicular to a plane of rotation of said arms.

15. The recorder of claim 14 further comprising an operating lever, and wherein said means for rotating said arms comprises a gear train and an operating lever, said gear train being responsive to movement of the operating lever, in order to rotate said arms.

16. The recorder of claim 15 wherein said gear train comprises a loading gear coupled to said operating lever, an intermediate gear engaging said loading gear and, a gear mounted on said arm in contact with said intermediate, gear said arm being mounted for rotation about a shaft, and said gear being mounted on said arm, concentric with said shaft.

17. The recorder of claims 14 or 15, wherein said rollers are mounted on a shaft positioned on said arm, a sliding part being disposed on said shaft, a cam section fixed to said recorder and positioned for engagement with said sliding part, wherein movement of said gear means shifts the position of said sliding part into engagement with said cam section to displace said shaft and said roller relative to said arm.

18. The recorder of claims 11 or 15 further comprising switch means responsive to said operating lever for selectively applying electric power to said recorder.

* * * * *